(12) United States Patent
Prosch et al.

(10) Patent No.: US 12,277,438 B2
(45) Date of Patent: Apr. 15, 2025

(54) MIGRATION BETWEEN CPU CORES

(71) Applicant: NetApp, Inc., San Jose, CA (US)

(72) Inventors: Kent Prosch, Boulder, CO (US); Matthew Weber, Wichita, KS (US); Arindam Banerjee, Boulder, CO (US); Ben McDavitt, Wichita, KS (US)

(73) Assignee: NETAPP, INC., San Jose, CA (US)

( * ) Notice: Subject to any disclaimer, the term of this patent is extended or adjusted under 35 U.S.C. 154(b) by 538 days.

(21) Appl. No.: 17/530,681

(22) Filed: Nov. 19, 2021

(65) Prior Publication Data

US 2022/0075649 A1 Mar. 10, 2022

Related U.S. Application Data

(63) Continuation of application No. 16/653,079, filed on Oct. 15, 2019, now Pat. No. 11,182,202, which is a continuation of application No. 15/890,481, filed on Feb. 7, 2018, now Pat. No. 10,459,759, which is a continuation of application No. 14/836,331, filed on Aug. 26, 2015, now Pat. No. 9,910,700.

(51) Int. Cl.
| | | |
|---|---|---|
| *G06F 9/46* | (2006.01) | |
| *G06F 9/48* | (2006.01) | |
| *G06F 9/50* | (2006.01) | |
| *G06F 15/16* | (2006.01) | |

(52) U.S. Cl.
CPC .............. *G06F 9/4856* (2013.01); *G06F 9/48* (2013.01); *G06F 9/4812* (2013.01); *G06F 9/50* (2013.01); *G06F 9/505* (2013.01); *G06F 15/16* (2013.01); *G06F 2209/482* (2013.01)

(58) Field of Classification Search
CPC ........ G06F 9/4856; G06F 9/48; G06F 9/4812; G06F 9/50; G06F 9/505; G06F 15/16; G06F 2209/482
See application file for complete search history.

(56) References Cited

U.S. PATENT DOCUMENTS

| | | |
|---|---|---|
| 5,721,931 A | 2/1998 | Gephardt et al. |
| 7,797,512 B1 | 9/2010 | Cheng et al. |
| 8,327,187 B1 | 12/2012 | Metcalf |
| 8,489,837 B1 | 7/2013 | Lee |
| 8,892,916 B2 | 11/2014 | Bieswinger |
| 9,910,700 B2 | 3/2018 | Prosch et al. |
| 10,459,759 B2 | 10/2019 | Prosch et al. |

(Continued)

OTHER PUBLICATIONS

Extended European Search Report for Application No. EP16840221, mailed Apr. 3, 2019, 17 pages.

(Continued)

*Primary Examiner* — Gregory A Kessler
(74) *Attorney, Agent, or Firm* — HAYNES AND BOONE, LLP

(57) ABSTRACT

Methods, non-transitory machine-readable media, and computing devices for transitioning tasks and interrupt service routines are provided. An example method includes processing, by a plurality of processor cores of a storage controller, tasks and interrupt service routines. A performance statistic is determined corresponding to the plurality of processor cores. Based on detecting that the performance statistic passes a threshold, a number of the plurality of processor cores that are assigned to the tasks and the interrupt service routines are reduced.

20 Claims, 4 Drawing Sheets

(56) References Cited

U.S. PATENT DOCUMENTS

| | | | |
|---|---|---|---|
| 11,182,202 | B2 | 11/2021 | Prosch et al. |
| 2004/0215987 | A1 | 10/2004 | Farkas et al. |
| 2008/0148015 | A1 | 6/2008 | Takamoto et al. |
| 2008/0163239 | A1 | 7/2008 | Sugumar |
| 2009/0007121 | A1 | 1/2009 | Yamada |
| 2009/0150474 | A1 | 6/2009 | Schneider |
| 2009/0187912 | A1 | 7/2009 | Lee |
| 2010/0299472 | A1 | 1/2010 | Tanaka et al. |
| 2012/0017219 | A1 | 1/2012 | Hsieh et al. |
| 2013/0238912 | A1 | 9/2013 | Priel |
| 2014/0026146 | A1 | 1/2014 | Jahagirdar et al. |
| 2014/0082630 | A1 | 3/2014 | Ginzburg et al. |
| 2014/0129808 | A1 | 5/2014 | Naveh et al. |
| 2014/0181830 | A1 | 6/2014 | Naik et al. |
| 2015/0200854 | A1 | 7/2015 | Buchnik |
| 2017/0041191 | A1* | 2/2017 | Kato ................ H04L 41/0897 |
| 2018/0083764 | A1 | 3/2018 | Dhakshinamurthy |

OTHER PUBLICATIONS

International Search Report and Written Opinion for Application No. PCT/US2016/049051, mailed Dec. 30, 2016, 20 pages.
Xing et al. "Utilization-Controlled Task Consolidation for Power Optimization in Multi-Core Real-Time Systems," Embedded and Real-time Computing Systems and Applications (RTCSA) IEEE 17th International Conference, Aug. 28, 2011, pp. 73-82, XP031968798.
International Preliminary Report on Patentability for Application No. PCT/US2016/049051 mailed on Feb. 27, 2018, 10 pages.
Examination Report for European Application No. 16840221.2, dated Jul. 14, 2020, 17 pages.

* cited by examiner

MIGRATION BETWEEN CPU CORES

CROSS-REFERENCE TO RELATED APPLICATIONS

The present application is a continuation of U.S. patent application Ser. No. 16/653,079, filed Oct. 15, 2019, which is a continuation of U.S. patent application Ser. No. 15/890,481, filed Feb. 7, 2018, and issued as U.S. Pat. No. 10,459,759 on Oct. 29, 2019, which is a continuation of U.S. patent application Ser. No. 14/836,331, filed Aug. 26, 2015, and issued as U.S. Pat. No. 9,910,700 on Mar. 6, 2018, each of which is herein incorporated by reference in its entirety.

TECHNICAL FIELD

The present description relates to multi-core processors and, more specifically, to systems, methods, and machine-readable media for migrating interrupt service routines (ISRs) and operating system (OS) tasks between CPU cores of one or more multi-core processors.

BACKGROUND

Conventional multi-core processors include two or more processing units integrated on an integrated circuit die or onto multiple dies in a chip package. These processing units are referred to as "CPU cores" or "cores." The cores of a multi-core processor may all run a single OS, with the workload of the OS being divided among the cores. This configuration, where the cores run the same OS, is referred to as symmetric multiprocessing (SMP).

SMP delivers the advantage of additional processing power. In particular, SMP offers significant performance benefits for heavy workloads by distributing operations among the cores. However, each operation that is divided between the cores increases the complexity of the processing of the operations, which increases latency. Latency, which may also be referred to as "response time," may refer to the time taken to complete an operation. Latency for operations divided between multiple cores may be increased due to processing overhead relating to the dividing of the operations between the cores. For example, latency may be increased by additional processing overhead of resource contention management mechanisms.

In contrast to latency is throughput. Throughput may refer to the average rate at which operations are completed. Providing multiple cores may allow for additional operations to be processed in parallel, thereby resulting in a performance benefit of increased throughput at the cost of increased latency. Thus, there is a trade-off between low latency for individual operations versus high throughput.

Accordingly, the potential remains for improvements that, for example, realize the performance benefits of a multi-core architecture while reducing latency.

BRIEF DESCRIPTION OF THE DRAWINGS

The present disclosure is best understood from the following detailed description when read with the accompanying figures.

DETAILED DESCRIPTION

Figure 1:
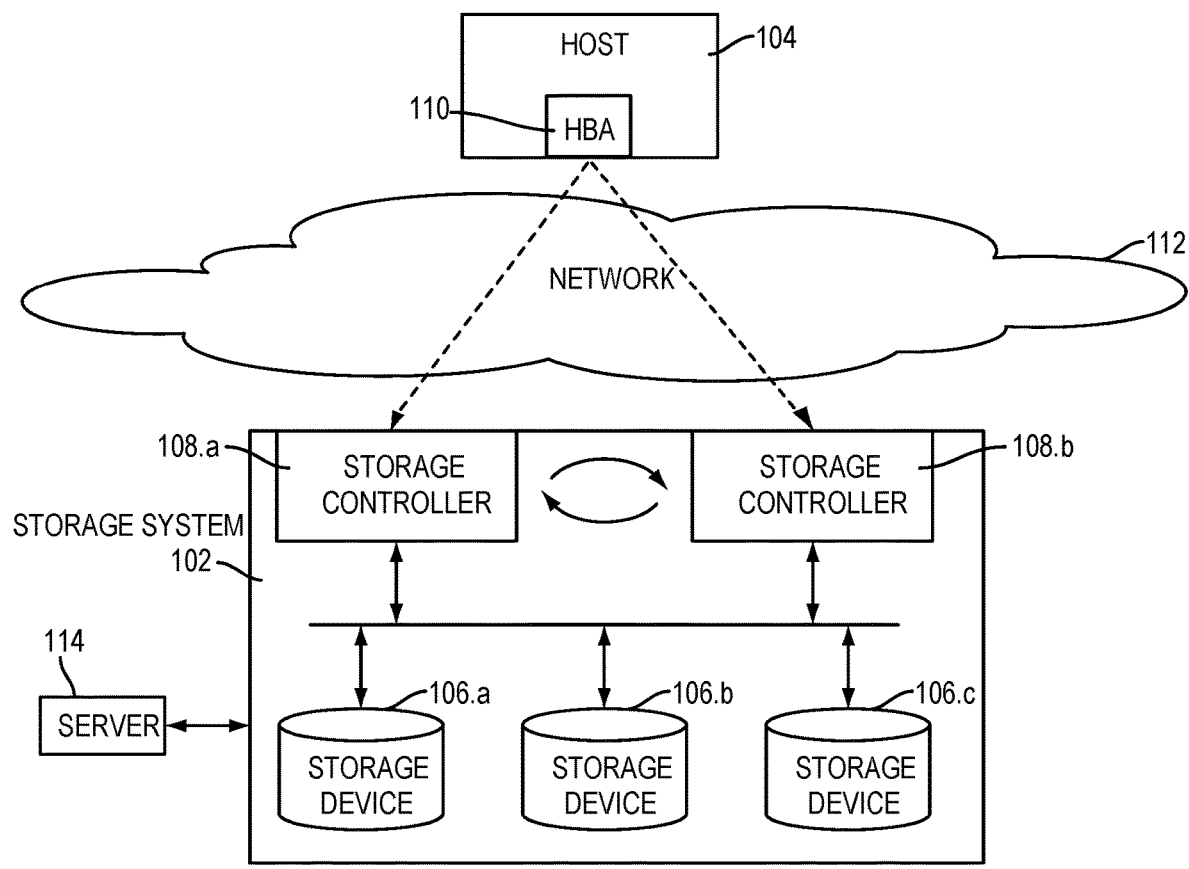
FIG. 1 is an organizational diagram of an exemplary data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for improving the operation of computing systems by migrating operations from a single core to multiple cores, from multiple cores to a single core, and from one or more cores to one or more other cores.

During operation of a performance-sensitive system during times of heavy workload, it is generally advantageous to spread the execution of operations across as many cores as possible in order to maximize the rate at which the system performs the operations. However, there are other contexts in which operation is improved by utilizing a single-core configuration. For example, during system initialization there may not yet be a heavy workload. Thus, tightly controlling the initialization sequence during initialization may be more critical than offering high performance. Further, during initialization, multi-core resource contention mechanisms (e.g., locks and queues) may be in the process of being configured, which adds additional complexity to a multi-core configuration. A single-core configuration offers simplicity and control advantages over a multi-core configuration. Therefore, during initialization, it may be desirable to run operations on a single core.

There are other contexts in which a single-core configuration can be beneficial. For example, when the system is under low or moderate workloads, reducing the number of cores that are processing operations may reduce the latency per operation. The reduction in latency results, at least in part, from lower resource contention management overhead. Thus, reducing the number of cores during times of non-heavy workloads results in the advantage of decreasing the per operation response time, at least in some systems.

The present system, method, and machine-readable medium dynamically manages the assignment of operations of a multi-core processing system in order to fine-tune overall performance and latency. In some examples, this tuning of overall performance and latency is performed by initially processing operations on a single core during an initialization process. Following initialization, an application is triggered that migrates operations (which include one or more tasks and/or ISRs) to other cores of the multi-core system. This migration includes, in some examples, the application creating or accessing (e.g., by checking or parsing) a mapping that identifies ISRs and tasks and maps each ISR and task to a target core.

In some examples, the following actions may be performed by an application that is executed by the processor having the multiple cores. The application blocks the tasks that are to be migrated from executing. The application also disables interrupts (e.g., interrupts generated by devices and/or tasks) corresponding to ISRs that are to be migrated. By blocking the tasks and disabling the interrupts, a source core that is currently assigned the tasks and ISRs is prevented from processing the tasks and interrupts assigned to the ISRs of the source core.

The application then assigns the interrupts and tasks to target cores. After assigning the interrupts and tasks, the application enables the assigned interrupts and unblocks the assigned tasks. Accordingly, operations that were previously assigned to a single core (e.g., the source core) are migrated to other cores from the source core, in order to spread the tasks and ISRs across the multi-core processing system. Specific examples for blocking, disabling, and enabling are described in more detail below.

The migration mechanism may also be used to assign interrupts and tasks from multiple cores to a single core when lower latency is desired. In the present example, a single core is selected as the target core for all of the tasks and ISRs of the multi-core processing system, and similar to the above description, each device interrupt and task is assigned from each core to the target core. Migrating from a multi-core configuration to a single-core configuration may be triggered by, for example, a component experiencing a fault, performance statistics, and so forth.

Additionally, migration of operations between cores may be used to rebalance tasks and interrupts across cores. For example, rebalancing may be triggered based on load balancing considerations, modified configurations, addition or subtraction of components, and so forth. Rebalancing is performed by migrating tasks and ISRs from one or more source cores to one or more target cores.

A data storage architecture 100, in which various embodiments may be implemented, is described with reference to FIG. 1. The storage architecture 100 includes a storage system 102 in communication with a host 104. The storage system 102 is a system that processes data transactions on behalf of other computing systems including one or more hosts, exemplified by the host 104. The storage system 102 may perform tasks to process data transactions (e.g., requests to read and/or write data) from one or more of the hosts, and take actions such as reading, writing, or otherwise accessing the requested data. For many exemplary transactions, the storage system 102 returns a response such as requested data and/or a status indictor to the requesting host 104. It is understood that for clarity and case of explanation, only a single storage system 102 and a single host 104 are illustrated, although any number of hosts may be in communication with any number of storage systems.

While the storage system 102 and the host 104 are referred to as singular entities, a storage system 102 and host 104 may each include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions.

The instructions, when executed by the processor, cause the processor to perform various operations described herein with respect to the storage controllers 108.*a*, 108.*b* in the storage system 102 in connection with embodiments of the present disclosure. Instructions may also be referred to as code. The terms "instructions" and "code" should be interpreted broadly to include any type of computer-readable statement(s). For example, the terms "instructions" and "code" may refer to one or more software applications, programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. In the present example, at least one processor is configured with a plurality of CPU cores, which are operable to perform computing instructions of tasks and/or ISRs that are spread among the plurality of cores.

The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106.*a*. 106.*b*, 106.*c* and responds to host 104's data transactions so that the storage devices 106.*a*. 106.*b*, 106.*c* appear to be directly connected (local) to the host 104. In various examples, the storage devices 106.*a*, 106.*b*, 106.*c* include hard disk drives (HDDs), solid state drives (SSDs), optical drives, and/or any other suitable volatile or non-volatile data storage medium. In some embodiments, the storage devices 106.*a*, 106.*b*, 106.*c* are relatively homogeneous (e.g., having the same manufacturer, model, and/or configuration). However, it is also common for the storage system 102 to include a heterogeneous set of storage devices 106.*a*. 106.*b*, 106.*c* that includes storage devices of different media types from different manufacturers with notably different performance.

The storage system 102 may group storage devices for speed and/or redundancy using a virtualization technique such as RAID (Redundant Array of Independent/Inexpensive Disks). The storage system 102 also includes one or more storage controllers 108.*a*, 108.*b* in communication with the storage devices 106.*a*. 106.*b*. 106.*c* and any respective caches (not shown). The storage controllers 108.*a*, 108.*b* exercise low-level control over the storage devices 106.*a*. 106.*b*, 106.*c* in order to execute (perform) data transactions on behalf of the host 104. The storage controllers 108.*a*. 108.*b* are illustrative only; as will be recognized, more or fewer may be used in various embodiments.

Having at least two storage controllers 108.*a*. 108.*b* may be useful, for example, for failover and load balancing purposes in the event of equipment failure of either one. Storage system 102 tasks, such as those performed by storage controller 108.*a* and 108.*b*, are configured to be monitored for performance statistics, such that data transactions and tasks may be balanced among storage controllers 108.*a*. 108.*b* via load balancing techniques, as well as between CPU cores of each storage controller 108.*a*. 108.*b*. For example, for failover purposes, transactions may be routed to the CPU cores of storage controller 108.*b* in the event that storage controller 108.*a* is unavailable. The storage system 102 may also be communicatively coupled to a user display for performing configuration of task and ISR mapping to target cores, displaying diagnostic and performance information, application output, and/or other suitable data.

Moreover, the storage system 102 is communicatively coupled to server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is referred to as a singular entity, the server 114 may include any number of computing devices and may range from a single computing system to a system cluster of any size.

In an embodiment, the server 114 may also provide data transactions to the storage system 102. Further, the server 114 may be used to configure various aspects of the storage system 102, for example under the direction and input of a user. In some examples, configuration is performed via a user interface, which is presented locally or remotely to a user. In other examples, configuration is performed dynamically by the server 114. Some configuration aspects may include definition of one or more mapping tables that associate ISRs and tasks with CPU cores, RAID group(s), disk pool(s), and volume(s), to name just a few examples.

With respect to the host 104, a host 104 includes any computing resource that is operable to exchange data with a storage system 102 by providing (initiating) data transactions to the storage system 102. In an exemplary embodiment, a host 104 includes a host bus adapter (HBA) 110 in communication with a storage controller 108.a. 108.b of the storage system 102. The HBA 110 provides an interface for communicating with the storage controller 108.a, 108.b, and in that regard, may conform to any suitable hardware and/or software protocol. In various embodiments, the HBA 110 includes Serial Attached SCSI (SAS), ISCSI, InfiniBand, Fibre Channel, and/or Fibre Channel over Ethernet (FCOE) bus adapters. Other suitable protocols include SATA, CSATA, PATA, USB, and FireWire. The HBA 110 of the host 104 may be coupled to the storage system 102 by a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many embodiments, a host 104 may have multiple communicative links with a single storage system 102 for redundancy. The multiple links may be provided by a single HBA 110 or multiple HBAs within the host 104. In some embodiments, the multiple links operate in parallel to increase bandwidth.

Figure 2:
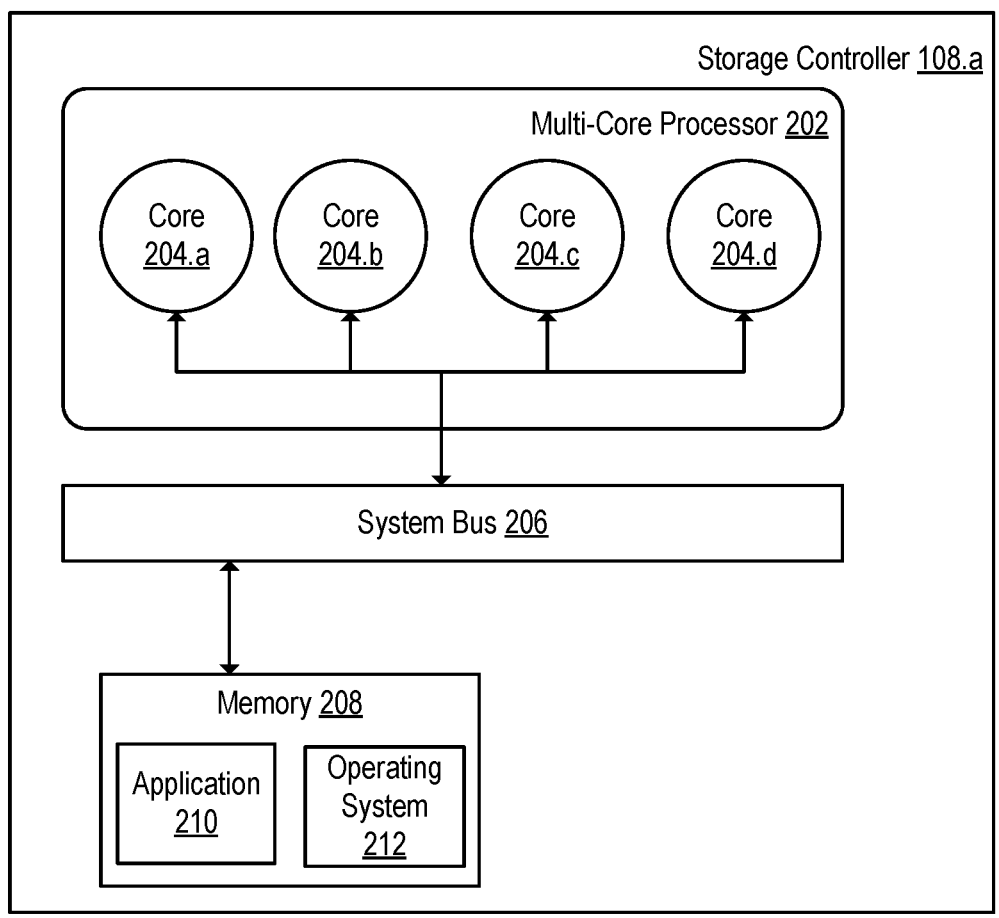
FIG. 2 is an organizational diagram of an exemplary storage controller architecture according to aspects of the present disclosure.

FIG. 2 illustrates an organizational diagram of an exemplary architecture 200 that includes storage controller 108.a of a storage system 102 according to aspects of the present disclosure. Storage controllers 108.a and 108.b are redundant for purposes of failover and load balancing, and the storage controller 108.a will be described as representative for purposes of simplicity of discussion. It is understood that storage controller 108.b performs functions similar to that described for storage controller 108.a, and similarly numbered items at storage controller 108.b have similar structures and perform similar functions as those described for storage controller 108.a below.

As shown in FIG. 2, the storage controller 108.a includes a multi-core processor 202. The multi-core processor 202 may include a microprocessor, a plurality of microprocessor cores, a microcontroller, an application-specific integrated circuit (ASIC), a central processing unit (CPU), a digital signal processor (DSP), a controller, a field programmable gate array (FPGA) device, another hardware device, a firmware device, or any combination thereof. In the present example, as shown in the illustration, the multi-core processor 202 includes multiple cores 204.a. 204.b, 204.c, 204.d. The multi-core processor 202 may also be implemented as a combination of computing devices (e.g., several multi-core processors, a plurality of microprocessors, one or more microprocessors in conjunction with a multi-core processor, or any other such configuration). While the multi-core processor 202 is referred to as a singular entity, a storage controller 108.a may include any number of multi-core processors, which may include any number of cores. For example, storage controller 108.a may include several multi-core processors, each multi-core processor having a plurality of cores. The term multi-core processor includes any processor, such as a dual-core processor, that includes two or more cores.

In the present example, the cores 204.a, 204.b, 204.c, 204.d are independent CPUs that are integrated into a single integrated circuit die or are integrated into multiple dies of a single chip package. In some examples, cores 204.a, 204.b, 204.c, 204.d share one or more caches. In other examples, cores 204.a, 204.b, 204.c, 204.d each are configured with access to an independent cache.

Each core 204.a, 204.b, 204.c, 204.d is configured with one or more ISRs that respond to interrupts. ISRs are software routines that hardware invokes responsive to interrupts. ISRs are configured to receive the interrupts, handle the interrupts and return output responsive to the interrupts. For example, a device interrupt that is sent to core 204.a triggers an ISR that is processed on core 204.a in order to handle the device interrupt.

Each core 204.a, 204.b, 204.c, 204.d is also configured to execute one or more tasks. A task may include any unit of execution. Tasks include, for example, threads, processes and/or applications executed by the storage controller 108.a. In some examples, a task is a particular transaction that is executed on behalf of a host such as querying data, retrieving data, uploading data, and so forth. Tasks may also include portions of a transaction. For example, a query of a data store could involve sub-parts that are each a separate task. The particular core assigned to the task executes the instructions corresponding to the task. Tasks may also be configured to generate interrupts, which are received, handled, and responded to by the ISRs that are assigned to the cores.

The multi-core processor 202 is coupled to a memory 208 via a system bus 206. One or more intermediary components, such as shared and/or individual memories (including buffers and/or caches) may be coupled between the cores 204.a, 204.b, 204.c. 204.d and the memory 208. In some examples, buffers are shared between cores. For example, a buffer may be a device level buffer that is external to the cores, but accessible by one or more cores. In other examples, each core is assigned a buffer at the core level. For example, a buffer may be hardwired or directly coupled to a core. Accordingly, in some examples, a buffer corresponding to a core may be configured at the device level or at each core. Memory 208 may include HDDs, SSDs, optical drives, and/or any other suitable volatile or non-volatile data storage medium. Memory 208 includes an operating system 212 (e.g., VxWorks, LINUX, UNIX, OS X, WINDOWS) and at least one application 210, which includes instructions that are executed by the multi-core processor 202. Additionally, memory 208 is configured with at least one mapping that is accessible to application 210. In some examples, the mapping is stored in a memory space that is associated with application 210. In other examples, the mapping is stored separately from application 210, such as in a database that is accessed by the application 210. The mapping identifies and performs a mapping between one or more tasks, one or more ISRs, and target cores. For example, a task may be mapped to a target core, indicating that the task is to be migrated to the target core when a migration process is performed. Similarly, an ISR may be mapped to a target core, indicating that the interrupts associated with that ISR are to be migrated to an ISR associated with the target core. The mapping may additionally associate tasks with ISRs, and interrupts with ISRs.

Multi-core processor 202 executes instructions of the application 210 and operating system 212 to perform operations of the storage controller 108.a, including processing transactions initiated by hosts. In the present example, application 210 is configured to manage a migration of tasks and ISRs between cores. In particular, application 210 is configured to identify, from the mapping, target cores corresponding to ISRs and tasks, in order to migrate the ISRs and tasks to the target cores. In some examples, migration of ISRs from a source core to a target core refers to assigning interrupts to a target core, such that the interrupts trigger ISRs on the target core rather than ISRs on the source core. Similarly, migration of tasks from a source core to a target core refers to assigning the tasks to a target core, such that the tasks are processed by the target core rather than by the source core.

The application 210 is configured to be executed either dynamically or according to one or more pre-configured conditions. In the present example, the application 210 is run on top of the operating system 212. In other examples, the application 210 is run prior to initializing the operating system 212 (e.g., by firmware of the storage controller 108.a). The application 210 is illustrated as a separate entity from the operating system 212, however, in some examples the application 210 may be included as a part of the operating system 212. In some examples, the application 210 is configured to be executed following an initialization process (e.g., after initializing an operating system or a particular application) to migrate tasks and ISRs to a plurality of cores. In other examples, the application 210 is configured to be executed if performance statistics indicate that the operation request rate has decreased below a pre-configured or calculated threshold, in order to rebalance the tasks and ISRs among the cores or to migrate the tasks and ISRs to a single core. In other words, migrating to fewer cores (or even a single core) may optimize processing during times when the operation request rate is below a threshold. Detecting that the operation request rate is below a threshold may also be referred to as detecting a low system load. When the operation request rate is detected to be below the threshold, the application 210 may determine that the benefits of reducing the per operation latency outweigh the costs of potentially reduced throughput, and thus migrate operations to fewer cores. For example, responsive to detecting a system load that is below a pre-configured or user-specified threshold (e.g., detecting a low system load), the plurality of tasks and ISRs may be migrated to fewer cores (e.g., a single core).

Application 210 is communicatively coupled to operating system 212. Further, application 210 is configured to request actions from operating system 212, such as blocking/unblocking of tasks, assignment of tasks and interrupts between cores and enabling/disabling of interrupts. Operating system 212 is configured with one or more interfaces with which the application 210 may interact to communicate the requests and receive information regarding assignments.

The above description provides an illustration of the architecture of storage controller 108.a. It is understood that storage controller 108.b performs similar operations.

Figure 3:
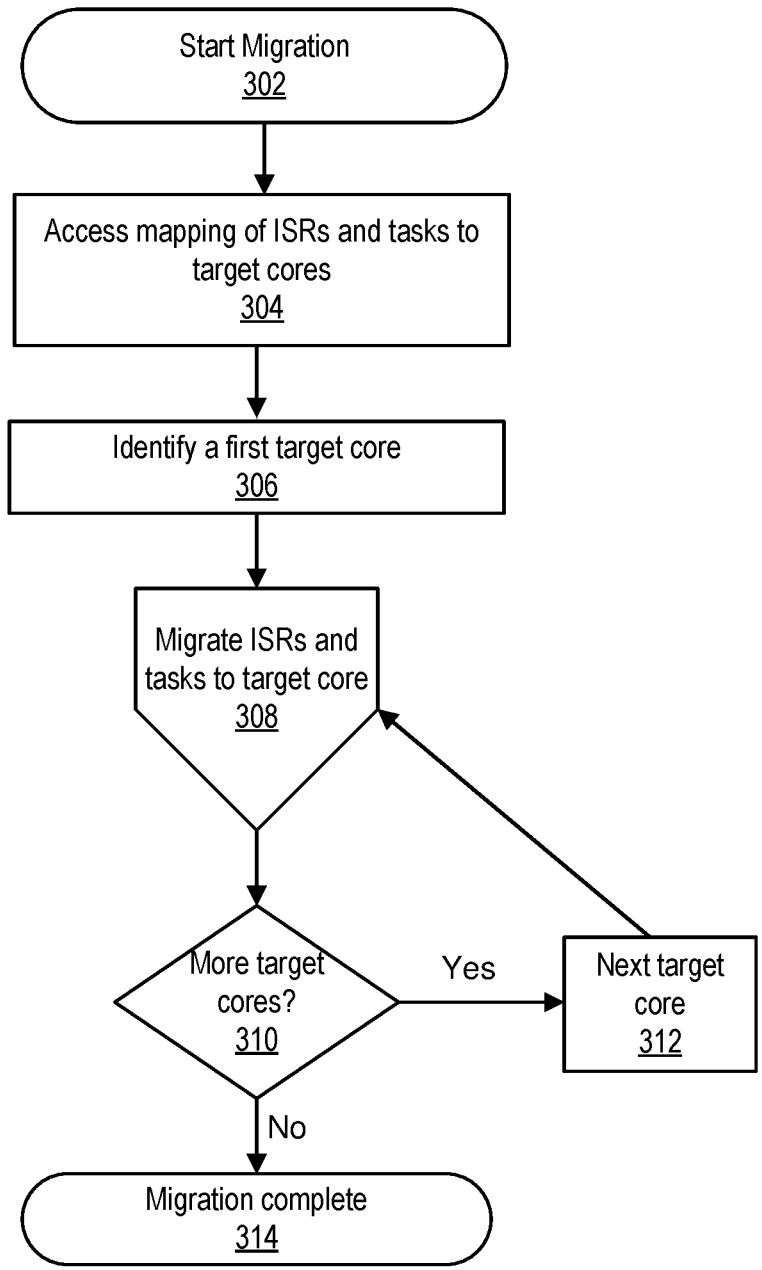
FIG. 3 is a flow diagram of a method of migrating tasks and ISRs from one or more source cores to one or more target cores according to aspects of the present disclosure.

Turning now to FIG. 3, a flow diagram of a method 300 of migrating tasks and ISRs from one or more source cores to one or more target cores, as is illustrated according to aspects of the present disclosure. In an embodiment, the method 300 may be implemented by one or more processors of one or more of the storage controllers 108.a. 108.b of the storage system 102, by executing computer-readable instructions to perform the functions described herein. It is understood that additional steps can be provided before, during, and after the steps of method 300, and that some of the steps described can be replaced or eliminated for other embodiments of the method 300.

At action block 302, a storage controller triggers the migration process. In the present example, the storage controller triggers the migration process by executing an application that is configured to manage the migration. In some examples, the application is executed following completion of an initialization sequence. In other examples, the application is executed dynamically based upon measured performance statistics, changed operating conditions, and so forth. The application is configured to migrate tasks and ISRs from a single core to multiple cores, from multiple-cores to a single core, and across cores of a plurality of cores (e.g., such as to perform load balancing or to respond to a core fault). In the present example, after completing an initialization sequence, the application migrates tasks and ISRs from a single core to a plurality of cores, such that the tasks and ISRs are spread evenly among the plurality of cores.

At action block 304, the storage controller accesses a mapping of ISRs and tasks to target cores. In some examples, the mapping is pre-configured, such as by a user via a user interface. In other examples, the mapping is dynamically generated, such as by measuring performance statistics and dynamically mapping each task and ISR to a target core based upon latency and workload considerations. The mapping is based, at least in part, on the number of cores available. In yet other examples, the mapping is provided by another entity, such as a server or a host.

In the mapping, each ISR and task is mapped to target core. In some examples, a task may perform functionality that is related to the functionality of an ISR. In some examples, the mapping is formatted as a table or a list that associates ISRs and tasks with target cores using rows, columns, or other delimiters. In the mapping each ISR and task may be mapped to a single target core (e.g., to migrate the tasks and ISRs from multiple cores to a single core). ISRs and tasks may also be mapped to a plurality of cores (e.g., a first task and a first ISR are mapped to a first core, while a second task and a second ISR are mapped to a second core) in order to migrate tasks and ISRs from a single core to a plurality of cores, or between cores of a plurality of cores.

At action block 306, a first target core is identified, for which to begin the migration of tasks and ISRs. The identifying of a first target core may be performed by, for example, the application specifying that the migrating is to begin at a pre-defined core (e.g., target core 0), with the target core being incremented to perform the migration in sequence for each target core until all tasks and ISRs have been migrated to all of the target cores. In other examples, based on the mapping, the application dynamically determines a target core with which to begin the migrating. For example, the application may check and/or parse the mapping to determine a particular target core for which to begin the migration. Determining a particular target core may be performed by, for example, parsing the mapping to identify all target cores and then selecting one of the identified target cores.

Figure 4:
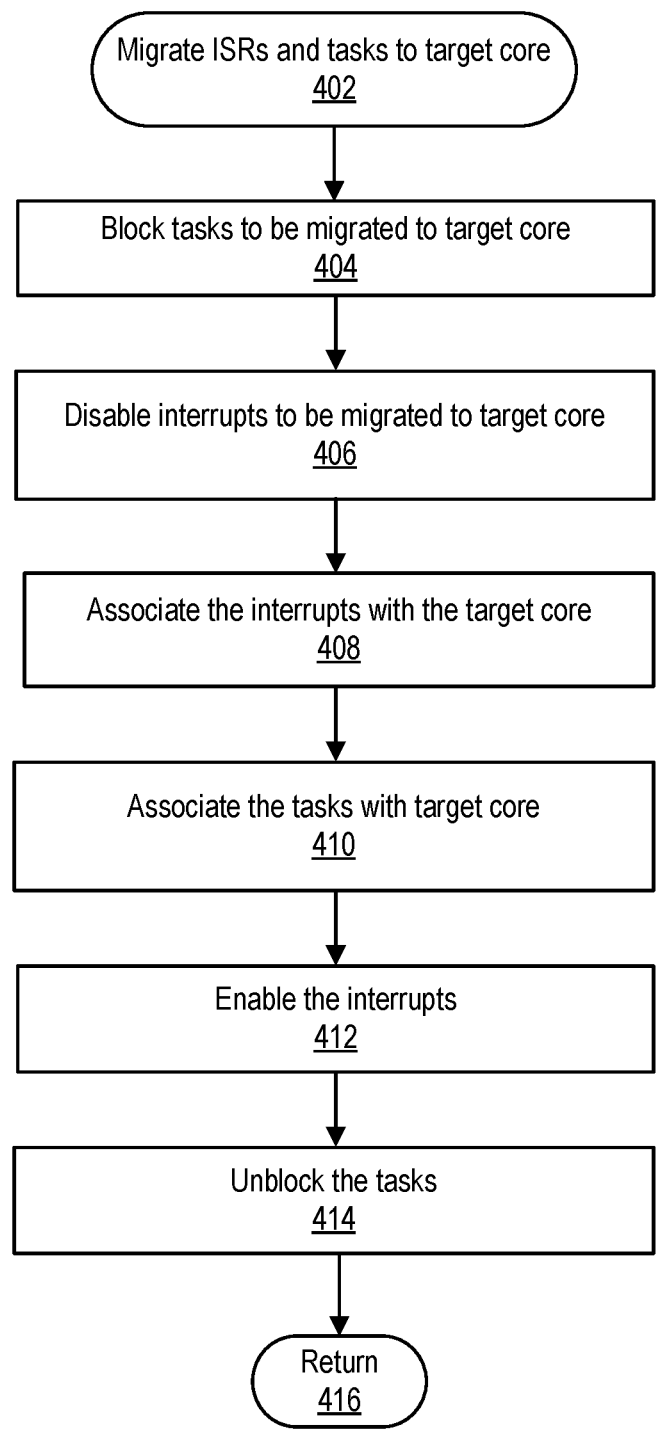
FIG. 4 is a flow diagram of a method of migrating ISRs and tasks from a source core to a target core according to aspects of the present disclosure.

At reference block 308, the storage controller migrates ISRs and tasks to the specified target core from the one or more source cores based on the mapping (e.g., parsing and/or checking the mapping). FIG. 4 illustrates an example process for performing the migration of ISRs and tasks with respect to each target core.

At decision block 310, the storage controller determines whether there are additional target cores that have not yet had the migration process performed. A "Yes" determination results in the process continuing to block 312 to continue migration with respect to the remaining target cores. A "No" determination results in the process completing at block 314.

At action block 312, the next target core is identified. In some examples, the first target core is core 0, and the target core is incremented in block 312, such that the migration is performed for each target core in a sequential manner. Upon identifying the next target core, the process is continued at reference block 308 (e.g., as illustrated in FIG. 4) to perform the migration for the identified target core.

At action block 314, the migration process is determined to have been completed for each of the target cores. Accordingly, the application that manages the migration is terminated or suspended.

The scope of embodiments is not limited to the actions shown in FIG. 3. Rather, other embodiments may add, omit, rearrange, or modify various actions. For instance, in a scenario wherein the storage controller includes separate chips, each with multiple cores, the storage controller may perform the same or similar method with respect to each chip.

FIG. 4 illustrates a flow diagram of a method 400 of migrating ISRs and tasks from a source core to a target core, as is illustrated according to aspects of the present disclosure. In an embodiment, the method 400 may be implemented by one or more processors of one or more of the storage controllers 108 of the storage system 102, executing computer-readable instructions to perform the functions described herein. It is understood that additional steps can be provided before, during, and after the steps of method 400, and that some of the steps described can be replaced or eliminated for other embodiments of the method 400.

At action block 402, the storage controller triggers the migration process with respect to a particular target core. In some examples, the migration process for the particular target core is triggered as part of a process that iterates through each of the target controllers in a sequential manner (e.g., as illustrated in FIG. 3).

At action block 404, tasks to be migrated to the target core are blocked. In the present example, these tasks that correspond to the target core are identified via a mapping, which identifies tasks and their target core. The application identifies tasks their corresponding target cores, for example, by checking and/or parsing the mapping to identify each task and a target core corresponding to each task. In some examples, the tasks that are mapped to the target core are blocked simultaneously. In other examples, tasks are blocked sequentially. Tasks that are blocked are prevented from executing. It is advantageous to block tasks prior to disabling interrupts because tasks may perform actions and/or operations that may result in interrupts being generated. Thus, by blocking the tasks, at least some interrupts may be prevented as well.

In some examples, the migration process is performed by an application that is executed by the storage controller. While the application is running, the cores are configured to execute tasks associated with the application. Tasks that are not associated with the application are not executed. Accordingly, by running the application, other tasks are blocked by the application, which prevents the other tasks from executing. In others examples, the application requests that each of the tasks identified by the checking and/or parsing of the mapping be suspended via an OS interface, thus blocking the tasks from executing. Accordingly, as described, the tasks may be blocked either automatically merely by the application running, or on a task by task basis as requested by the application.

At action block 406, interrupts to be migrated to the target core are disabled. In the present example, these interrupts that correspond to the target core are identified via a mapping, which identifies ISRs, interrupts associated with the ISRs, and a target core. The application checks and/or parses the mapping to identify the ISRs, interrupts associated with the ISRs and a target core corresponding to each ISR and interrupt. In some examples, the interrupts parsed by the application are disabled by the application requesting that the interrupts be disabled via an OS interface. In some examples, the interrupts are disabled simultaneously with blocking the tasks. In other examples, the interrupts are disabled after blocking the tasks. Examples of interrupts include error message interrupts, data/transfer ready interrupts, and so forth. In the present example, while interrupts are disabled from processing on their assigned core, any incoming interrupts at that assigned core remain in a pending and/or buffered state until re-assigned and enabled at the target core. For example, the interrupts may remain buffered in a cache assigned with the assigned core until the interrupts are re-enabled on the target core.

At action block 408, the disabled interrupts are associated with the target core. This action may be performed via, for example, an OS interface that accepts as input one or more interrupts and their target core, and assigns the disabled interrupts to their target core.

At action block 410, the blocked tasks are assigned to the target core. This action may be performed via, for example, an OS interface that accepts as input one or more tasks and their target core.

At action block 412, the disabled interrupts are enabled. The interrupts may be enabled by, for example, requesting that the interrupts be enabled via an OS interface. Once enabled, any pending/buffered interrupts are then processed by the target core.

At action block 414, the blocked tasks are unblocked. The application may unblock tasks using an OS interface. This action may be performed via, for example, an OS interface that accepts as input one or more tasks and their target core. In another example, if the application is configured to block any tasks not associated with the application from running, the application may be terminated in order to unblock the tasks. In this configuration, the closing of the application may be performed after all tasks are migrated to all target cores, in order to simultaneously unblock all tasks.

In some examples, the interrupts are enabled simultaneously with unblocking the tasks. In other examples, the interrupts are enabled prior to the unblocking of the tasks.

At action block 416, the migration process is determined to have been completed with respect to the target core. If there are additional target cores for which to migrate tasks, the process may be performed with respect to each of the additional target cores, as is illustrated in FIG. 3.

The examples provided above specifically address the various concepts being applied to a storage system. However, the scope of embodiments is not so limited. Rather, the principles described herein may be applied to any appropriate computer system that uses multiple cores and/or multiple processors and can assign tasks and interrupts among the cores and/or processors.

Various embodiments described herein provide advantages over prior systems and methods. For instance, a conventional system that utilizes multiple cores may unnecessarily increase latency during operations that would be more efficiently performed by a single core under a low workload. Similarly, a conventional system that processes operations using a single core may not have the throughput advantages offered by multiple cores during times of high workload. Various embodiments described above utilize pre-configured and/or dynamic migration of tasks and ISRs when appropriate. Various embodiments improve the operation of the storage system 102 of FIG. 1 by increasing the efficiency of workload processing. Put another way, some embodiments are directed toward a problem presented by the architecture of some storage systems, and those embodiments provide migration techniques that may be adapted into those architectures to improve the performance of the machines used in those architectures.

The present embodiments can take the form of an entirely hardware embodiment, an entirely software embodiment, or an embodiment containing both hardware and software elements. In that regard, in some embodiments, the computing system is programmable and is programmed to execute processes including the processes of methods 300 and 400 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

processing, by a plurality of processor cores of a storage controller, one or more tasks;

generating, by the storage controller, a mapping of the one or more tasks to the plurality of processor cores;

accessing, by the storage controller, the mapping to identify a second one or more processor cores;

identifying, based on the mapping by a workload application executing on the storage controller in response to a performance statistic corresponding to the plurality of processor cores meeting a threshold, a first task of the one or more tasks to migrate from a first one or more processor cores to the second one or more processor cores of the plurality of processor cores, the second one or more processor cores being different than the first one or more processor cores;

migrating, by the workload application executing on the storage controller in response to the identifying the first task, the first task from the first one or more processor cores to the second one or more processor cores, by:

blocking, by the workload application executing on the storage controller, the first task from running on the first one or more processor cores while the first one or more processor cores remain enabled to execute the workload application; and unblocking, by the workload application executing on the storage controller, the first task to run on the second one or more processor cores in response to associating the first task with the second one or more processor cores.

2. The method of claim 1, further comprising:

processing, by the storage controller, one or more interrupt service routines;

identifying, by the workload application executing on the storage controller in response to the performance statistic corresponding to the plurality of processor cores meeting the threshold, a first interrupt service routine of the one or more interrupt service routines to migrate from the first one or more processor cores to the second one or more processor cores; and migrating, by the workload application executing on the storage controller, the first interrupt service routine from the first one or more processor cores to the second one or more processor cores.

3. The method of claim 2, wherein the migrating the first interrupt service routine further comprises:

disabling, by the workload application executing on the storage controller, the first interrupt service routine on the first one or more processor cores;

associating, by the workload application executing on the storage controller, the first interrupt service routine with the second one or more processor cores; and enabling, by the workload application executing on the storage controller, the first interrupt service routine on the second one or more processor cores.

4. The method of claim 2, wherein the mapping further includes a mapping of the one or more interrupt service routines to the one or more processor cores and a mapping of the one or more tasks to the one or more interrupt service routines.

5. The method of claim 1, wherein the performance statistic meets the threshold based on at least one of an imbalance in a load among the plurality of processor cores, a failure of one or more of the plurality of processor cores, or a modification of a configuration of the plurality of processor cores.

6. The method of claim 1, further comprising:
measuring, by the storage controller, one or more performance statistics, wherein the performance statistic is selected from the one or more performance statistics; and
rebalancing, by the storage controller, the one or more tasks among the plurality of processor cores based on the performance statistics.

7. The method of claim 1, further comprising:
mapping, dynamically by the storage controller, each task of the one or more tasks to a target processor core of the plurality of processor cores based on latency and workload of the plurality of processor cores.

8. A non-transitory machine-readable medium having stored thereon instructions which when executed by at least one machine, causes the at least one machine to:
process one or more tasks and one or more interrupt service routines on one or more processor cores of the at least one machine;
receive a mapping of the one or more tasks to the one or more processor cores and the one or more interrupt service routines to the one or more processor cores;
identify a second subset of processor cores based on the received mapping;
identify, based on the received mapping, a first task of the one or more tasks and a first interrupt service routine of the one or more interrupt service routines to migrate from a first subset of processor cores of the one or more processor cores to the second subset of processor cores, the second subset of processor cores being different than the first subset of processor cores;
migrate the first interrupt service routine from the first subset of processor cores to the second subset of processor cores; and
block the first task from running on the first subset of processor cores while the first subset of processor cores remain enabled to execute a workload application;
associate the first task with the second subset of processor cores; and
unblock the first task to run on the second subset of processor cores.

9. The non-transitory machine-readable medium of claim 8, wherein the instructions when executed further cause the at least one machine to:
identify, by the workload application in response to a performance statistic meeting a threshold, a first interrupt service routine of the plurality of interrupt service routines to migrate from the first subset of processor cores to the second subset of processor cores; and
migrate, by the workload application, the first interrupt service routine from the first subset of processor cores to the second subset of processor cores.

10. The non-transitory machine-readable medium of claim 9, wherein the migrate the first interrupt service routine further comprises:
disable, by the workload application, the first interrupt service routine on the first subset of processor cores;
associate, by the workload application, the first interrupt service routine with the second subset processor cores; and
enable, by the workload application, the first interrupt service routine on the second subset processor cores.

11. The non-transitory machine-readable medium of claim 8, wherein the instructions when executed further cause the at least one machine to:
map, based on at least one of latency and workload, the one or more tasks and the one or more interrupt service routines to the one or more processor cores to identify the second processor core.

12. The non-transitory machine-readable medium of claim 8, wherein the first task is identified in response to a performance statistic corresponding to the one or more processor cores meeting a threshold, and wherein the performance statistic meets the threshold based on at least one of an imbalance in a load among the one or more processor cores, a failure of one or more of the one or more processor cores, or a modification of a configuration of the one or more processor cores.

13. The non-transitory machine-readable medium of claim 8, wherein the received mapping further includes a mapping of the one or more tasks to the one or more interrupt service routines to identify the second subset of the of processor cores.

14. The non-transitory machine-readable medium of claim 8, wherein the first task is migrated to a predefined processor core of the second subset of processor cores.

15. A computing device comprising:
a memory having stored thereon instructions for performing a method of rebalancing one or more tasks and one or more interrupt service routines among one or more processor cores; and
a processor coupled to the memory, the processor configured to execute the instructions to:
identify a second subset of processor cores among the one or more processor cores based on a mapping of the one or more tasks to the one or more processor cores and the one or more interrupt service routines to the one or more processor cores;
identify, based on the mapping by a workload application executed by the processor in response to a performance measurement meeting a threshold, a first task of the one or more tasks and a first interrupt service routine of the one or more interrupt service routines to migrate from a first subset of processor cores of the one or more processor cores to the second subset of processor cores of the one or more processor cores;
migrate, by the workload application, the first task from the first subset of processor cores to the second subset of processor cores; and
migrate, by the workload application, the first interrupt service routine from the first subset of processor cores to the second subset processor cores, by further executing the instructions to:
disable, by the workload application, the first interrupt service routine on the first subset of processor cores while the first subset of processor cores remain enabled to execute the workload application;
associate, by the workload application, the first interrupt service routine with the second subset of processor cores; and
enable, by the workload application, the first interrupt service routine on the second subset of processor cores.

16. The computing device of claim 15, wherein the processor is further configured to execute the instructions to migrate the first task to the second subset of processor cores, by:
block, by the workload application, the first task from running on the first subset of processor cores;

assign the first task to the second subset of processor cores; and unblock, by the workload application, the first task to run on the second subset processor cores.

17. The computing device of claim 15, wherein the processor is further configured to execute the instructions to:

generate the mapping of the one or more tasks to the one or more processor cores, and the one or more interrupt service routines to the one or more processor cores, wherein the generated mapping further includes a mapping of the one or more tasks to the one or more interrupt service routines; and identify the second subset of processor cores based on the generated mapping.

18. The computing device of claim 15, wherein the performance measurement meets the threshold based on at least one of an imbalance in a load among the one or more processor cores, a failure of one or more of the one or more processor cores, or a modification of a configuration of the one or more processor cores.

19. The computing device of claim 15, wherein the processor is further configured to execute the instructions to:

receive the mapping of the one or more tasks to the one or more processor cores, and the one or more interrupt service routines to the one or more processor cores, wherein the received mapping further includes a mapping of the one or more tasks to the one or more interrupt service routines; and identify the second subset of processor cores based on the received mapping.

20. The computing device of claim 15, wherein the processor is further configured to execute the instructions to:

dynamically determine, based on measured latency and workload from executing the workload application, a target processor core of the first subset of processor cores with which to begin the migration of the first task.

* * * * *